United States Patent [19]
Ruhnke

[11] 3,715,660
[45] Feb. 6, 1973

[54] DETERMINING DISTANCE TO LIGHTNING STROKES FROM A SINGLE STATION

[75] Inventor: Lothar H. Ruhnke, Boulder, Colo.

[73] Assignee: The United States of America as represented by the Administrator of the National Aeronautics and Space Administration

[22] Filed: Dec. 30, 1971

[21] Appl. No.: 213,949

[52] U.S. Cl. ................................324/72, 73/170 R
[51] Int. Cl. ..........................................G01r 31/02
[58] Field of Search........324/72; 73/170 R; 340/227, 340/420, 421

[56] References Cited

UNITED STATES PATENTS

| 3,611,365 | 10/1971 | Lundquist | 73/170 R |
| 3,465,245 | 9/1969 | Fischer | 324/72 |
| 2,953,020 | 9/1960 | Hunt | 324/72 |

Primary Examiner—Michael J. Lynch
Attorney—James O. Harrell et al.

[57] ABSTRACT

Apparatus for determining the distance to lightning strokes from a single station. The apparatus includes a first loop antenna system for sensing the magnetic field produced by the lightning which signal is filtered, square rooted, and fed into a peak voltage holding circuit. A second antenna is provided for sensing the electric field produced by the lightning which is fed into a filter, an absolute value meter, and to a peak voltage holding circuit. A multivibrator gates the magnetic and electric signals through the peak holding circuits to a ratio meter which produces a signal corresponding to the ratio between the magnetic component and the electric component. The amplitude of this signal is proportional to the distance from the apparatus to the lightning stroke.

4 Claims, 1 Drawing Figure

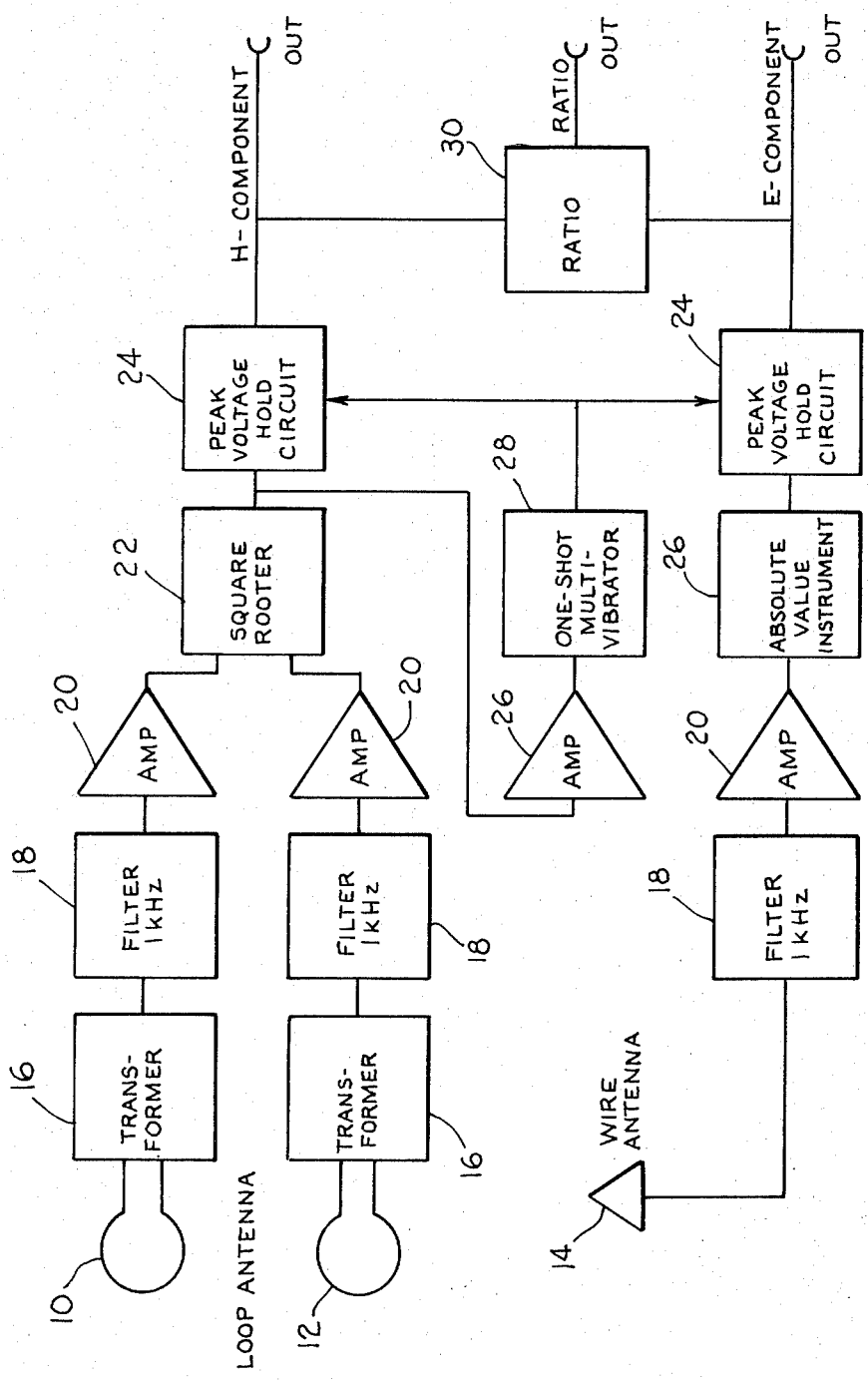

DETERMINING DISTANCE TO LIGHTNING STROKES FROM A SINGLE STATION

The invention described herein was made in performance of work under a NASA contract and is subject to the provisions of Section 305 of the National Aeronautics and Space Act of 1968, Public Law 85-568 (72 Stat. 435, 402 U.S.C.P. 2457).

The invention relates to an apparatus for determining the distance to lightning strokes from a single station, and more particularly to an apparatus which compares the electric and magnetic fields generated by the lightning for producing a signal having an amplitude corresponding to the distance from the apparatus to the lightning stroke.

It has become increasingly important, especially in launching missiles and the like to know if lightning storms are in the launch vicinity so as to avoid the possibility of lightning striking space vehicles during launch. The space industry has become particularly aware of thunder storms since one of the recently launched Saturn vehicles was hit by lightning during launch. As a result, extreme precaution has been taken to locate all lightning storms within the general vicinity prior to launch. Heretofore, one method of determining the distance to lightning was by measuring the period of time between visually observing a lightning stroke and hearing the thunder produced thereby. However, locating lightning strokes is usually done from two stations with direction finders that sense the electromagnetic field produced by the lightning. For a rapid readout of information such an installation needs a data transmission link between the two observation sites and a computational device to calculate the position of the lightning stroke from the location of the observation sites and the direction of the lightning. One problem with such devices is the requirement that the directional finder must be located at different sites.

The apparatus constructed in accordance with the present invention is capable of determining the distance to lightning strokes from a single station. From tests and calculations it has been determined that the distance to a lightning stroke within approximately 30 miles is directly proportional to the ratio of the magnetic field to the electrical field generated by the lightning stroke. The subject apparatus is capable of measuring both the electric and magnetic field to generate a signal corresponding to such ratio.

In accordance with the present invention, it has been found that difficulties encountered with determining the distance to lightning strokes may be overcome by providing a novel apparatus. This apparatus when used for determining the distance to the lightning strokes includes the following basic parts: (1) An antenna system for sensing the magnetic field generated by a lightning stroke, (2) a filter for isolating a predetermined frequency of the signal generated by the magnetic field out of the magnetic signal, (3) a square rooter for taking the square root of the signals produced by the antenna system so as to generate a magnetic signal free of polarity and direction, (4) a peak voltage hold circuit coupled to the output of the square rooter for generating a signal having an amplitude corresponding to the amplitude of the magnetic signal produced by the lightning, (5) a second antenna provided for sensing the electric field generated by the lightning stroke, (6) a filter for isolating a predetermined frequency out of the electric signal received by the second antenna, (7) an absolute value instrument coupled to the output of the filter for producing an electric signal free of polarity, (8) a second peak voltage circuit coupled to the output of the absolute value instrument for generating a signal having an amplitude proportional to the magnitude of the electric field generated by the lightning stroke, (9) a one-shot multivibrator for gating the signals received by the first and second peak voltage circuits to allow the signal representing the magnetic component and the signal representing the electrical component to be fed through the respective peak voltage circuits, and (10) a ratio meter coupled to the outputs of the first and second peak voltage circuits for generating a signal having an amplitude proportional to the distance between the apparatus and the lightning strokes.

Accordingly, it is an important object of the present invention to provide an apparatus for producing a signal indicative of the distance between a lightning stroke and the apparatus.

Another important object of the present invention is to provide an apparatus for determining the distance to lightning strokes from a single station.

Other objects and advantages will become more apparent from a reading of the following detailed description and appended claims taken in conjunction with the accompanying drawing wherein:

The FIGURE is a schematic diagram showing the apparatus constructed in accordance with the present invention.

Referring in more detail to the drawing, a schematic diagram of the apparatus for determining the distance to lightning strokes from a single station is illustrated. The magnetic field produced by the lightening stroke is sensed by a pair of loop antennas 10 and 12, respectively. Two crossed loop antennas are necessary to produce a signal that is independent of the azimuth of the source. The loop antennas 10 and 12 are constructed of a coil having a predetermined number of windings, such as in one particular device in the range of 5 to 10. This may vary according to the particular application. Each loop antenna 10 and 12 produces a voltage $V_m$ which depends on the angle $\theta$ of the loops plane to the signal source, the frequency of observation $\omega$, the loop area $F$, and the number of turns $n$ according to the following formula:

$$V_m = \mu \cdot H \cdot \omega \cdot F \cdot n \cdot \cos\theta$$

This voltage $V_m$ appears usually as a very low impedance source having a very small value. A wire antenna 14 is utilized to sense the electric field produced by the lightning stroke and is a high impedance device which produces a higher voltage than that produced by the loop antennas 10 and 12. Therefore, it is essential in order to accurately compare the voltages produced by the magnetic and electrical fields that the antenna systems produce signals that are comparable. The voltage $M_m$ produced by the loop antennas 10 and 12 appears usually as a very low impedance source because of technical difficulties to construct high loop inductances. A transformer 16 can be used to match this inductance to a following filter 18 for bringing the voltage $V_m$ to a magnitude comparable with the voltage received by the electrical antenna 14. Since there is a difference in the internal impedance of the loop antennas 10 and 12 and the wire antenna 14, it is necessary to utilize the transformers 16 having an impedance, which in combination with the low impedance of the loop antenna is equal to the high impedance of the wire antenna is equal to the high impedance of the wire antenna 14. Therefore, the loop antenna plus the transformer 16 have the same impedance as the wire antenna 14. The output of the transformer 16 is coupled to 1 kHz filter 18, which filters out a predetermined frequency, which in the particular embodiment illustrated, is 1 kHz. The internal impedance of the filter 18 should be matched with the following amplifier 20 which is utilized to amplify the magnetic signal received by the loop antenna 10. A similar filter 18 and amplifier 20 are utilized with the loop antenna 12. Of course, it is to be understood that instead of using a transformer in combination with the loop antenna 10 to match the impedance of the wire antenna 14 a loop antenna having many windings and the same impedance as the wire antenna could be utilized. However, such is not practical due to the large number of windings required.

The filter 18 is a narrow band filter which averages the signal being received over a short period of time and in one particular embodiment is approximately one-half a second.

The reason that a pair of loop antennas are utilized is to produce a resultant signal which is independent of the direction that the loop antennas receive the magnetic signal. Since the magnetic field has a direction and the loop antennas 10 and 12 are directionally sensitive, if one of the loop antennas were placed in a North-South direction and the other antenna were placed in an East-West direction the resultant signal produced by both of the antennas 10 and 12 would compensate for variations in direction. The electric antenna 14 does not encounter this problem since it does not have any directional characteristics.

Therefore the outputs of amplifier 20 coming from the loop antennas 10 and 12, respectively, are normally different and are fed into a conventional square rooter 22 for adding the voltage together to produce a voltage on the output of the square rooter which is independent of direction and polarity The output of the square rooter is, in turn, fed to a peak voltage holding circuit 24, as well as to an amplifier 26 coupled to the input of a one-shot multivibrator 28. The output of the one-shot multivibrator 28 is, in turn, coupled to a gating input of the peak voltage holding circuit 24. The output voltage from the square rooter 22 takes the form of a positive pulse which rises according to the distance to the lightening stroke and magnitude of the lightning. Since the maximum amplitude of the pulse coming out of the square rooter is proportional to the distance from the apparatus to the lightning stroke, it is desired to generate the magnetic signal having an amplitude over a predetermined duration equal to the maximum amplitude of the output voltage from the square rooter. The peak voltage holding circuit stays at a peak voltage as long as a pulse is present from the one-shot multivibrator 28. The output of the peak voltage holding circuit is a pulse having an amplitude corresponding to the magnetic field produced by the lightning stroke. In one particular embodiment the one-shot multivibrator 28 produces a pulse of one second duration so as to hold the output signals from the peak voltage holding circuit 24 at the maximum voltage produced by the square rooter 22.

Referring now to the circuit which includes the wire antenna 14 for measuring the electrical field produced by the lightning stroke such includes identical components such as the filter 18, the amplifier 20 and the peak voltage holding circuit 24 as the circuits provided with the loop antennas. The absolute value instrument 26 is the same as the square rooter 24 with a single input since there in only one signal being fed thereto. It is important that all of the components in the electric circuit modify the signal received from the wire antenna the same degree as the same components in the magnetic circuit. In one particular embodiment in order to make the wire antenna compatible with the filter 18 a 10 kilohom resistor is connected between the wire antenna 14 and ground. As previously mentioned, the impedance of the 10 kilohom resistor and the wire antenna equals the impedance of a loop antenna 12 and a transformer 16. The output of the wire antenna 14 is fed into a one kilohertz filter 18, amplified by amplifier 20 and fed to an absolute value instrument 26. A peak holding circuit 24 is provided for producing a voltage having an amplitude corresponding to the maximum value of the signal produced by the absolute value instrument and holding that signal as long as a pulse from the one-shot multivibrator 28 is present. The magnetic and electrical components from the peak holding voltage circuits 24 are fed into a ratio meter which generates a signal on its output having an amplitude corresponding to H/E. The ratio meter 30 is a conventional analogue device which divides the electrical component into the magnetic component H and produces an output voltage which is proportional to the ratio of the magnetic component of the lightning wave received over the electrical component of the lightning wave received. This ratio varies according to the distance from the lightning stroke to the apparatus, since the electric and magnetic components vary directly with the distance to the lightning stroke.

While a preferred embodiment of the invention has been described using specific terms, such description is for illustrative purposes only, and it is to be understood that changes and variations may be made without departing from the spirit or scope of the following claims.

What is claimed is:

1. An apparatus for determining the distance to lightning strokes comprising:
  A. a first antenna system for sensing the magnetic field generated by the lightning stroke and generating a magnetic signal responsive thereto,
  B. filter means coupled to said first antenna system for isolating a predetermined frequency from said magnetic signal,
  C. a square rooter coupled to the output of said first filter means for producing a non-polarity magnetic signal,
  D. a first peak voltage meter coupled to said square rooter for generating a signal having an amplitude proportional to the magnitude of the magnetic field generated by said lightning stroke,
  E. a second antenna system for sensing the electric field generated by said lightning stroke and generating an electric signal responsive thereto, F. a filter coupled to said second antenna system for isolating a predetermined signal from said electric signal,
G. an absolute value instrument coupled to said filter for producing a non-polarity electric signal,
H. a second peak voltage meter coupled to said absolute value instrument for generating a signal having an amplitude proportional to the magnitude of the electric field generated by said lightning stroke, and
I. means for comparing said signal having an amplitude proportional to the magnitude of the magnetic field with said signal having an amplitude proportional to the magnitude of said electric field for generating a signal having an amplitude proportional to the distance between said apparatus and said lightning stroke.

2. The apparatus as set forth in claim 1 wherein said first antenna system includes:

A. a pair of directional loop antennas, and
B. said directional antennas being positioned perpendicular to each other.

3. The apparatus as set forth in claim 1 further comprising:

A. a pulse generating source, and
B. means for coupling said pulse generating source to said first and second peak voltage meters for activating said peak voltage meters.

4. The apparatus as set forth in claim 3 wherein:

A. said pulse generating source is a one shot multivibrator, and
B. means for coupling said one shot multivibrator to the output of said square rooter for generating a pulse of a predetermined duration responsive to said square rooter producing said non-polarity magnetic signal.

* * * * *